United States Patent
Zhang

(10) Patent No.: US 10,118,163 B1
(45) Date of Patent: Nov. 6, 2018

(54) METHODS FOR PRODUCING HIERARCHICAL MESOPOROUS ZEOLITE BETA

(71) Applicant: Saudi Arabian Oil Company, Dhahran (SA)

(72) Inventor: Ke Zhang, Stoneham, MA (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/662,756

(22) Filed: Jul. 28, 2017

(51) Int. Cl.
| | |
|---|---|
| *C01B 39/02* | (2006.01) |
| *B01J 29/70* | (2006.01) |
| *C01B 39/46* | (2006.01) |
| *B01J 35/10* | (2006.01) |
| *B01J 37/04* | (2006.01) |
| *B01J 37/10* | (2006.01) |

(52) U.S. Cl.
CPC ......... *B01J 29/7007* (2013.01); *B01J 35/109* (2013.01); *B01J 35/1038* (2013.01); *B01J 35/1061* (2013.01); *B01J 37/04* (2013.01); *B01J 37/10* (2013.01); *C01B 39/026* (2013.01); *C01B 39/46* (2013.01); *C01P 2002/72* (2013.01); *C01P 2006/14* (2013.01); *C01P 2006/16* (2013.01)

(58) Field of Classification Search
CPC ..... C01B 39/025; C01B 39/026; C01B 39/46; C01P 2002/72; C01P 2006/14; C01P 2006/16; B01J 29/7007; B01J 35/1038; B01J 35/1061; B01J 35/109
See application file for complete search history.

(56) References Cited

U.S. PATENT DOCUMENTS

| | | | |
|---|---|---|---|
| 5,601,798 A | 2/1997 | Cooper et al. | |
| 5,871,650 A | 2/1999 | Lai et al. | |
| 8,486,369 B2 | 7/2013 | Garcia-Martinez et al. | |
| 8,951,498 B2 * | 2/2015 | Larsen | B82Y 30/00 423/702 |
| 2007/0227351 A1 | 10/2007 | Garcia-Martinez | |

OTHER PUBLICATIONS

Groen et al (2008), Mesoporous beta zeolite obtained by desilication, Microporous and Mesoporous Materails 114 (2008) 93-102.*

Liu, J. et al.; Alkaline-Acid Treated Mordenite and Beta Zeolites Featuring Mesoporous Dimensional Uniformity; Materials Letters; Jun. 14, 2014; pp. 78-81; vol. 132; Elsevier.

Perez-Ramirez, J. et al.; Tailored Mesoporosity Development in Zeolite Crystals by Partial Detemplation and Desilication; Advanced Functional Materials; Jan. 9, 2009; pp. 1640172; vol. 19, No. 1; Wiley-VCH GmbH & Co.

dos Santos, L.R.M. et al; Creation of Mesopores and Structural Re-Organization in Beta Zeolite During Alkaline Treatment; Microporous and Mesoporous Materials; Feb. 4, 2016; pp. 260-266; vol. 226; Elsevier.

Groen, J.C. et al.; On the Introduction of Intracrystalline Mesoporosity in Zeolites Upon Desilication in Alkaline Medium; Microporous and Mesoporous Materials; Apr. 8, 2004; pp. 29-34; vol. 69, No. 1-2; Elsevier Inc.

International Search Report and Written Opinion pertaining to Application No. PCT/US2017/056085 dated Feb. 16, 2018.

Ding et al.,"LCO hydrotreating with Mo—Ni and W—Ni supported on nano- and micro-sized zeolite beta", Applied Catalysis A: General 353, pp. 17-23 (2009).

Li et al., "Realizing the Commercial Potential of Hierarchical Zeolites: New Opportunities in Catalytic Cracking", ChemCatChem, vol. 6, pp. 46-66 (2014).

Mitchell et al., "Structural analysis of hierarchically organized zeolites", Nature Communications, DOI: 10.1038/ncomms9633, pp. 1-14, Oct. 20, 2015.

Verboekend et al., "Mesopore Formation in USY and Beta Zeolites by Base Leaching: Selection Criteria and Optimization of Pore-Directing Agents", Crystal Growth & Design, vol. 12, pp. 3123-3132 (2012).

Verboekend et al., "Hierarchical Y and USY Zeolites Designed by Post-Synthetic Strategies", Adv. Funct. Mater., vol. 22, pp. 916-928 (2012).

Zhang et al., "Optimization of Hierarchical Structures for Beta Zeolites by Post-Synthetic Base Leaching", Ind. Eng. Chem. Res, vol. 55, pp. 8567-8575 (2016).

Moeller et al., "Mesoporosity—a new dimension for zeolites", Chem. Soc. Rev., vol. 42, pp. 3689-3707 (2013).

* cited by examiner

*Primary Examiner* — David M Brunsman
(74) *Attorney, Agent, or Firm* — Dinsmore & Shohl LLP

(57) ABSTRACT

Embodiments of the present disclosure are directed to a method of producing hierarchical mesoporous zeolite beta. The method comprises providing a parent zeolite beta with a silicon to aluminum molar ratio of 5 to 50. The method further comprises, mixing the parent zeolite beta with an aqueous metal hydroxide solution and heating the parent zeolite beta and aqueous metal hydroxide mixture to a temperatures greater than or equal to 100° C. to produce the hierarchical mesoporous beta zeolites having and average pore size greater than 8 nm. In embodiments, the hierarchical mesoporous beta zeolites are produced without a templating agent or pore-directing agent.

8 Claims, 4 Drawing Sheets

METHODS FOR PRODUCING HIERARCHICAL MESOPOROUS ZEOLITE BETA

BACKGROUND

Technical Field

This disclosure relates to methods for producing mesoporous zeolite beta. More specifically, this disclosure relates to method for producing hierarchical mesoporous zeolite beta without a templating agent or a pore-directing agent.

Background

Zeolite beta is a crystalline aluminosilicate used as a catalyst, molecular sieve, filter, adsorbent, drying agent, cation exchanger, dispersing agent, and detergent builder. Zeolite beta can be used as a catalyst in, for example, alkylation reactions, acylation reactions, tetrahydropyranyl ether synthesis reactions, ketone reduction reactions. The petrochemical and chemical industries use zeolite beta in alkylation and acylation reactions, catalytic cracking, and isomerization. Zeolite beta is used because it has a large surface area per unity mass, a large ion-exchange capacity, strong acidity, and stability at high temperatures.

Different zeolites such as zeolite A, zeolite beta, mordenite, and zeolite Y vary in pore structure, pore size, acidity, acid site strength, acid site distribution, and stability. These intrinsic differences make the applications of one zeolite different than the applications of another. Zeolite beta is often chosen for its stability at elevated temperatures and the compatibility of its acid sites with hydrocracking reactions. Hydrocracking reactions break up hydrocarbon feed or hydrocarbon fraction into smaller molecules. Typical hydrocarbon feedstocks for hydrocracking reactions using zeolite beta include vacuum gas oil, deasphalted gas oil, and light cycled oil.

Zeolite beta has micropores—that is, pores with diameters less than or equal to 2 nanometers (nm). Specifically, pores of zeolite beta have a pore size of from 0.5 nm to 1 nm. As a result, zeolite beta is not effective with reactants larger than the 2 nm diameter of the mesopores of zeolite beta. Further, using zeolite beta with reactants larger than 2 nm can cause coking of the reactants onto the zeolite beta, reducing catalytic efficiency and shortening the catalytic life of the zeolites. To solve these deficiencies of using zeolite beta as a catalyst, zeolite beta with hierarchical mesopores may also be used. Hierarchical mesoporous zeolite beta has micropores and mesopores, pores with a diameter greater than 2 nm and less than 50 nm. The mesopores facilitate the transport of molecules to the catalytic sites and reduce the diffusion limitations of these molecules.

Hierarchical mesoporous zeolites may be produced by conventional techniques known in the art, but these techniques have advantages and disadvantages. One technique, known as "top-down" synthesis, involves the chemical erosion of microporous zeolite beta to create mesopores. In "top-down" synthesis, the chemical agent used to dissolve the aluminosilicate framework to create mesopores also decreases the crystallinity of the zeolite. Traditionally, "top-down" synthesis is performed at temperatures around 65° C.; higher temperatures, closer to 100° C., are believed to further decrease the crystallinity of the zeolite. The decreased crystallinity of the zeolite results in less catalytically active sites and overall decreased catalytic efficiency for the zeolite beta. Pore-directing agents may be used in top-down synthesis to protect zeolite crystallinity during the chemical treatment of the zeolites. Mesopores created by "top-down" synthesis are also formed in a random and unpredictable pattern on the surface of zeolite beta and have an average pore size from 2 nm to 5 nm.

Another technique, known as "bottom-up" synthesis starts with zeolite precursors—sometimes a gel or solution—and builds hierarchical mesoporous zeolites around a templating agent. While "bottom-up" synthesis allows for more control of where the mesopores form and preserves the crystallinity of the zeolite beta, the templating agents are costly and conventionally must be used in large quantities. Further, the use of templating agents or pore-directing agents also requires additional time and labor intensive steps to separate the agents from the zeolite beta.

SUMMARY

Therefore, there exists a need for a method for producing hierarchical mesoporous zeolite beta that preserves the crystallinity of the zeolite beta without using a templating agent or a pore-directing agent. Embodiments relate to synthesizing hierarchical mesoporous zeolite beta in reaction conditions similar to traditional "bottom-up" synthesis, but using existed microporous beta zeolites as in conventional "top-down" synthesis. The resulting zeolites are mesoporous while surprisingly retaining crystallinity and acidity.

The produced hierarchical mesoporous zeolite beta may be used as a catalyst in a hydrocracking reaction. In one or more embodiments, the hierarchical mesoporous zeolite beta has mesopores to allow for the catalytic reaction of molecules too large to enter zeolite beta micropores, that is, molecules larger than 2 nm. Additionally, embodiments allow for a reduction in diffusion limitation for from 0.5 nm to 1 nm molecules. In embodiments, the produced hierarchical mesoporous zeolite beta also retains the crystallinity and acidity of the parent zeolite beta.

Embodiments of the present disclosure are directed to a method of producing hierarchical mesoporous zeolite beta. The method comprises providing a parent zeolite beta with a silicon to aluminum ratio of at least 5. The method further comprises, mixing the parent zeolite beta with an aqueous metal hydroxide solution and heating the parent zeolite beta and aqueous metal hydroxide mixture to a temperature greater than or equal to 100° C. to produce the hierarchical mesoporous beta zeolites having and average pore size greater than 8 nm. In embodiments, the hierarchical mesoporous beta zeolites are produced without a templating agent or pore-directing agent.

Additional features and advantages of the described embodiments will be set forth in the detailed description which follows, and in part will be readily apparent to those skilled in the art from that description or recognized by practicing the described embodiments, including the detailed description which follows, the claims, as well as the appended figures.

Figure 1:
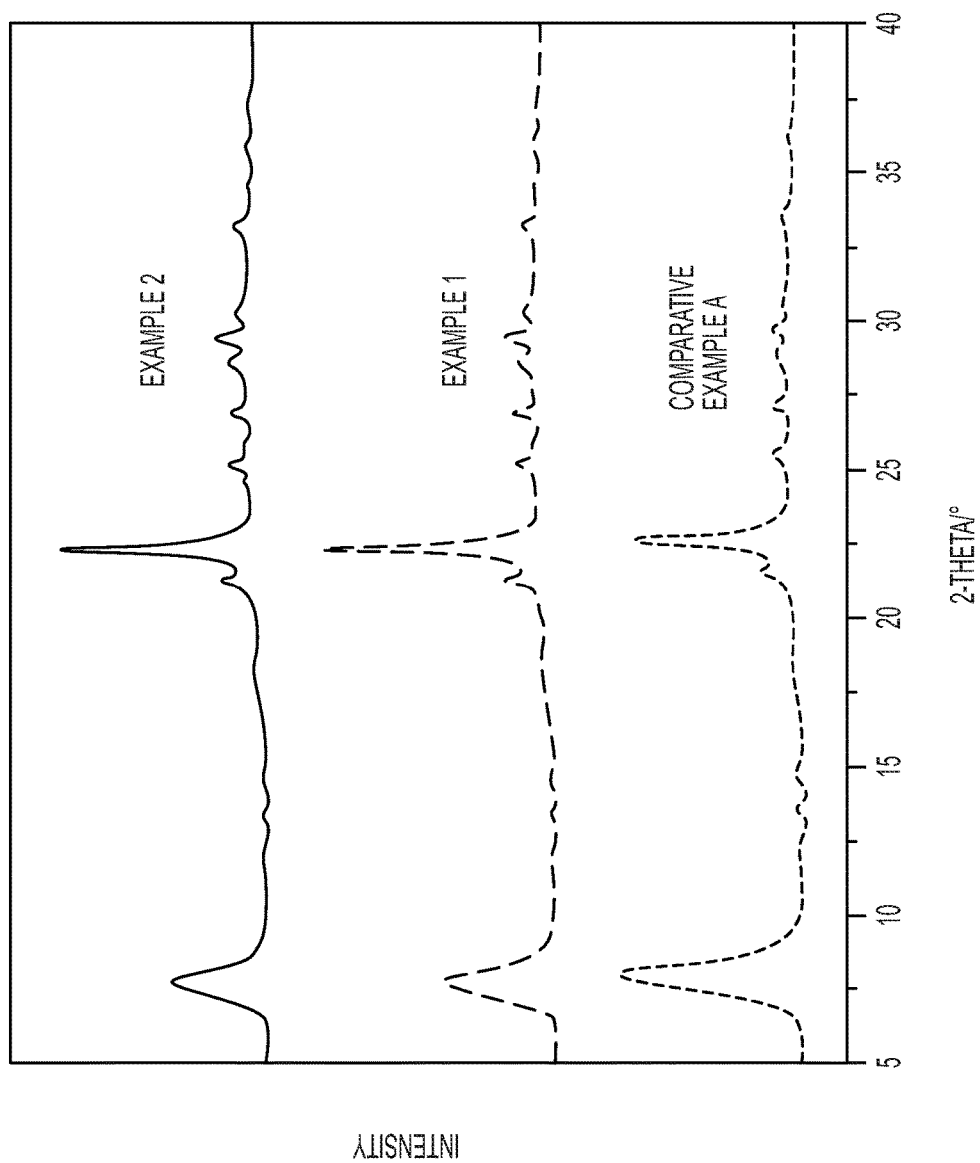
FIG. 1 illustrates an x-ray diffraction (XRD) pattern of parent zeolite beta as compared to two hierarchical mesoporous zeolite beta catalysts.

The embodiments set forth in the drawings are illustrative in nature and not intended to be limiting to the claims. Moreover, individual features of the drawings will be more fully apparent and understood in view of the detailed description.

DETAILED DESCRIPTION

Embodiments of the present disclosure are directed to a method of producing hierarchical mesoporous zeolite beta. The method comprises providing a parent zeolite beta with a silicon to aluminum ratio of at least 5. The method further comprises, mixing the parent zeolite beta with an aqueous metal hydroxide solution and heating the parent zeolite beta and aqueous metal hydroxide mixture to temperatures greater than or equal to 100° C. to produce the hierarchical mesoporous beta zeolites having and average pore size greater than 8 nm. In embodiments, the hierarchical mesoporous beta zeolites are produced without a templating agent or pore-directing agent.

As used in the present disclosure, microporous zeolites refer to zeolite particles which have a size, as measured by their longest dimension, of less than or equal to 100 nm. In some embodiments, the microporous parent zeolite beta particles are present as a single crystal structure. The parent zeolite betas may have an average size from 1 nm to 800 nm. In other embodiments, the parent zeolite betas may have an average size from 1 nm to 650 nm; from 1 nm to 500 nm; from 50 nm to 800 nm; from 100 nm to 800 nm; from 200 mm to 800 nm; from 200 nm to 500 nm; from 300 nm to 800 nm, or from 50 nm to 600 nm. The average size of a zeolite refers to the averaged value of the size of all particles of a zeolite in a given catalyst. In one or more embodiments, the provided parent zeolite beta has a molar ratio of silicon to aluminum ratio of at least 5. In other embodiments, the parent zeolite beta may have a molar ratio of from 5 to 50; from 10 to 50; from 10 to 40; from 12 to 40; from 10 to 30; or from 12 to 30.

In one embodiment, the method may include a step of providing parent beta zeolites. The step of providing parent beta zeolites may include process such as, by way of non-limiting example, synthesizing the microporous parent beta zeolites or directly acquiring the parent beta zeolites from another source. It should be understood that multiple methods known in the art may be available to synthesize parent beta zeolites. In one embodiment, the step of providing parent beta zeolites includes providing a colloidal mixture comprising parent beta zeolites, silica, alumina, and water.

In one or more embodiments, a method for producing hierarchical mesoporous beta zeolites may further comprise mixing the parent beta zeolites with an aqueous metal hydroxide solution. The aqueous metal hydroxide solution may include a single metal hydroxide species, or may be a combination of two or more metal hydroxide chemical species. In one embodiment, the aqueous metal hydroxide solution comprises at least one alkali metal hydroxide, at least one alkali earth metal hydroxide, or combinations thereof. In other embodiments, the aqueous metal hydroxide solution may comprise LiOH, NaOH, KOH, RbOH, Mg(OH)$_2$, Ca(OH)$_2$, Sr(OH)$_2$, Ba(OH)$_2$, or combinations thereof. Without being limited by theory, it is believed the mixing step evenly disperses the parent beta zeolites and aqueous metal hydroxide solution. Mixing may comprise stirring, swirling, vortexing, shaking, sonicating, homogenizing, blending, similar processes, or combinations thereof.

In one or more embodiments, the aqueous metal hydroxide solution has a metal hydroxide concentration from 0.01 moles per liter (M) to 10 M. In other embodiments, the aqueous metal hydroxide solution has a concentration from 0.01 M to 5 M; 0.01 M to 3 M; 0.01 M to 1 M; 0.05 M to 1 M; 0.05 M to 0.8 M; 0.05 M to 0.5 M; or 0.1 M to 0.4 M. In one or more embodiments, the parent beta zeolite and aqueous metal hydroxide mixture has a pH greater than or equal to 12. In other embodiments, the parent beta zeolite and aqueous metal hydroxide mixture has a pH greater than or equal to 13; from 12 to 14; or from 13 to 14.

In one or more embodiments, a method for producing hierarchical mesoporous beta zeolites may further comprise heating the parent beta zeolite and aqueous metal hydroxide mixture. In embodiments, the heating may occur at temperatures greater than or equal to 100° C. In other embodiments, the heating step may occur at temperatures from 100° C. to 500° C.; from 125° C. to 500° C.; from 150° C. to 500° C.; from 175° C. to 500° C.; from 200° C. to 500° C.; from 250° C. to 500° C.; from 100° C. to 400° C.; from 100° C. to 300° C.; from 100° C. to 250° C.; from 125° C. to 300° C.; from 150° C. to 300° C.; or from 125° C. to 250° C. In one or more embodiments, the parent beta zeolite and aqueous metal hydroxide mixture is heated for a time interval of greater than or equal to 1 hour. In other embodiments, the parent beta zeolite and aqueous metal hydroxide mixture is heated for a time interval of from 1 hour to 16 hours; from 4 hours to 16 hours; from 16 hours to 48 hours; from 16 hours to 30 hours; from 16 hours to 24 hours; from 18 hours to 48 hours; from 18 hours to 30 hours; from 18 hours to 24 hours; or from 24 hours to 48 hours.

In one or more embodiments, a method for producing hierarchical mesoporous beta zeolites produces hierarchical mesoporous beta zeolites with an average pore size greater than 8 nm. Pore size can be measured by Barrett-Joyner-Halenda (BJH) analysis. BJH analysis measures the amount of gas that detaches from a material at 87 K over a series of pressures. Using the Kelvin equation, of the amount of argon adsorbate removed from the pores of the material together with the relative pressure of the system, can calculate the average pore size of the sample. In embodiments, the method produces hierarchical mesoporous beta zeolites with an average pore size from 8 nm to 25 nm; from 8 nm to 20 nm; from 10 nm to 25 nm; from 10 nm to 20 nm; from 12 nm to 25 nm; from 12 nm to 20 nm; from 8 nm to 18 nm; from 8 nm to 16 nm; or from 12 nm to 18 nm.

Non-Local Density Functional Theory (NLDFT) method can measure the total pore volume of the mesoporous material with the desorption data. The NLDFT method was designed to take into account the rough surface area of crystalline silica materials. In embodiments, the method produces hierarchical mesoporous beta zeolites with a total pore volume greater than or equal to 0.35 cubic centimeters per gram (cm$^3$/g); greater than or equal to 0.4 cm$^3$/g; greater than or equal to 0.45 cm$^3$/g; or even greater than or equal to 0.5 cm$^3$/g.

In conventional hierarchical mesoporous beta zeolite production methods, if maintaining the crystallinity of microporous beta zeolites is desired, then templating agents or pore-directing agents are required. Templating agents may be calcined with the zeolite precursor at temperatures greater than or equal to 300° C. for a time intervals of at least 1 hour. After calcination, the templating agents may be burned off the zeolite. Templating agents of conventional hierarchical mesoporous beta zeolite production methods may be organic or in organic in nature. Templating agents may include, by way of non-limiting example, hydrocarbon polymers, nitrogen doped hydrocarbon polymers, tetraethylammonium hydroxide, imethoxsilylpropyldimethyloctadecyl ammonium chloride, tetrapropyl ammonium hydroxide, cetyltrimethylammonium bromide, or combinations thereof. In embodiments, the hierarchical mesoporous beta zeolites are produced without templating agents.

In conventional "top-down" hierarchical mesoporous beta zeolite production methods, pore-directing agents may be incorporated into the precursor zeolite solution and calcined at temperatures greater than or equal to 300° C. for a time interval of at least 1 hour. Pore-directing agents of conventional top-down hierarchical mesoporous beta zeolite production methods may include cationic surfactants and non-ionic surfactants. Cationic surfactant pore-directing agents may include, by way of non-limiting example, dodecyltrimethylammonium, cetyltrimethylammonium, prop yltrimethylammonium, tetraethylammonium, tetrapropylammonium, octyltrimethylammonium, or combinations thereof. Non-ionic surfactant pore-directing agents may include, by way of non-limiting example, monoamines, polyamines, or combinations thereof. In embodiments, the hierarchical mesoporous beta zeolites are produced without pore-directing agents. In one or more embodiments, mesopores are created by mixing parent zeolite beta with an aqueous metal hydroxide and heating the mixture in a teflon lined autoclave. The mixture is heated to temperatures greater than those conventionally used in "top-down" synthesis at an autogenous pressure. In the alkaline solution, under the elevated pressure and temperature, mesopores form within the beta zeolites.

Without being limited by theory, it is believed that upon contacting the zeolite during the heating process, the alkaline solution creates the mesopores by preferentially extracting silicon from the zeolite framework (also known as desilication). Further, when the temperature is above 100° C. and the pressure is above ambient atmospheric pressure, the synthetic conditions become similar as the conventional bottom-up approach that favors crystallization of zeolites. During this process, the appropriate amounts of aluminum are critical in achieving hierarchical mesopore formation while preserving zeolite crystallinity. The existence of aluminum in the zeolite framework prevents excessive silicon extraction by the alkaline solution and maintains a zeolite framework with locally-desilicated area that can be recrystallized at the synthetic conditions. Therefore, the crystallinity of the resulting mesoporous zeolites can be preserved during the formation of mesopores.

Crystallinity is a relative property that is generally more relevant in "top-down" zeolite synthesis methods, since this approach starts with parent microporous zeolites as reference samples for direct comparison. It measures how well the acidic sites, that is, the catalytic sites are being preserved in the process of creating mesopores. So, for example, in a conventional "top-down" zeolite synthesis, the crystallinity of the chemically eroded mesoporous zeolite is compared with that of the starting microporous zeolite. The crystallinity of two materials may be compared by XRD. If a parent zeolite exhibits certain XRD peaks, a mesoporous zeolite produced from the parent zeolite with preserved crystallinity exhibits the same peaks with comparable peak intensities. Additionally, crystallinity may be measured by NH3-TPD. In NH3-TPD, the desorption of ammonia from a material is measured over a range of temperatures. If a produced mesoporous zeolite has a similar temperature of maximum desorption as the parent zeolite, then the acidity and crystallinity were deemed as preserved.

EXAMPLES

In the following Examples, hierarchical mesoporous beta zeolites were compared with a microporous parent beta zeolite. The produced hierarchical mesoporous beta zeolites maintained their crystallinity during production, Additionally, mesopores were formed during the production of the hierarchical mesoporous beta zeolites.

Comparative Example A

As previously mentioned, crystallinity is a comparative property. The crystallinity of the example hierarchical mesoporous beta zeolites will be compared to that of their parent beta zeolites. Comparative Example A is a microporous parent beta zeolite catalyst with a silicon to aluminum ratio of 14.

Example 1

Example 1 is a hierarchical mesoporous beta zeolite produced from the parent beta zeolites of Comparative Example A. First, 0.37 g of the parent beta zeolite was mixed with 10 milliliters (mL) of 0.2M NaOH. The resulting mixture was sealed in a Teflon lined autoclave and placed in a heating oven at 150° C. for 21 hours. The mixture was then quenched to room temperature.

Example 2

Example 2 is a hierarchical mesoporous beta zeolite produced from the parent beta zeolites of Comparative Example A. First, 0.37 g of the parent beta zeolite was mixed with 10 milliliters (mL) of 0.3M NaOH. The resulting mixture was sealed in a Teflon lined autoclave and placed in a heating oven at 150° C. for 21 hours. The mixture was then quenched to room temperature.

FIG. 1 shows the XRD pattern for Comparative Example A, Example 1, and Example 2. As can be seen in FIG. 1, Comparative Example A exhibited peaks at 2-theta values of about 8 degrees and about 22.5 degrees. Examples 1 and 2 also exhibited comparable peaks at these 2-theta values. This shows that the crystallinity of the parent beta zeolite beta was preserved in the production of the hierarchical mesoporous beta zeolite.

Figure 2:
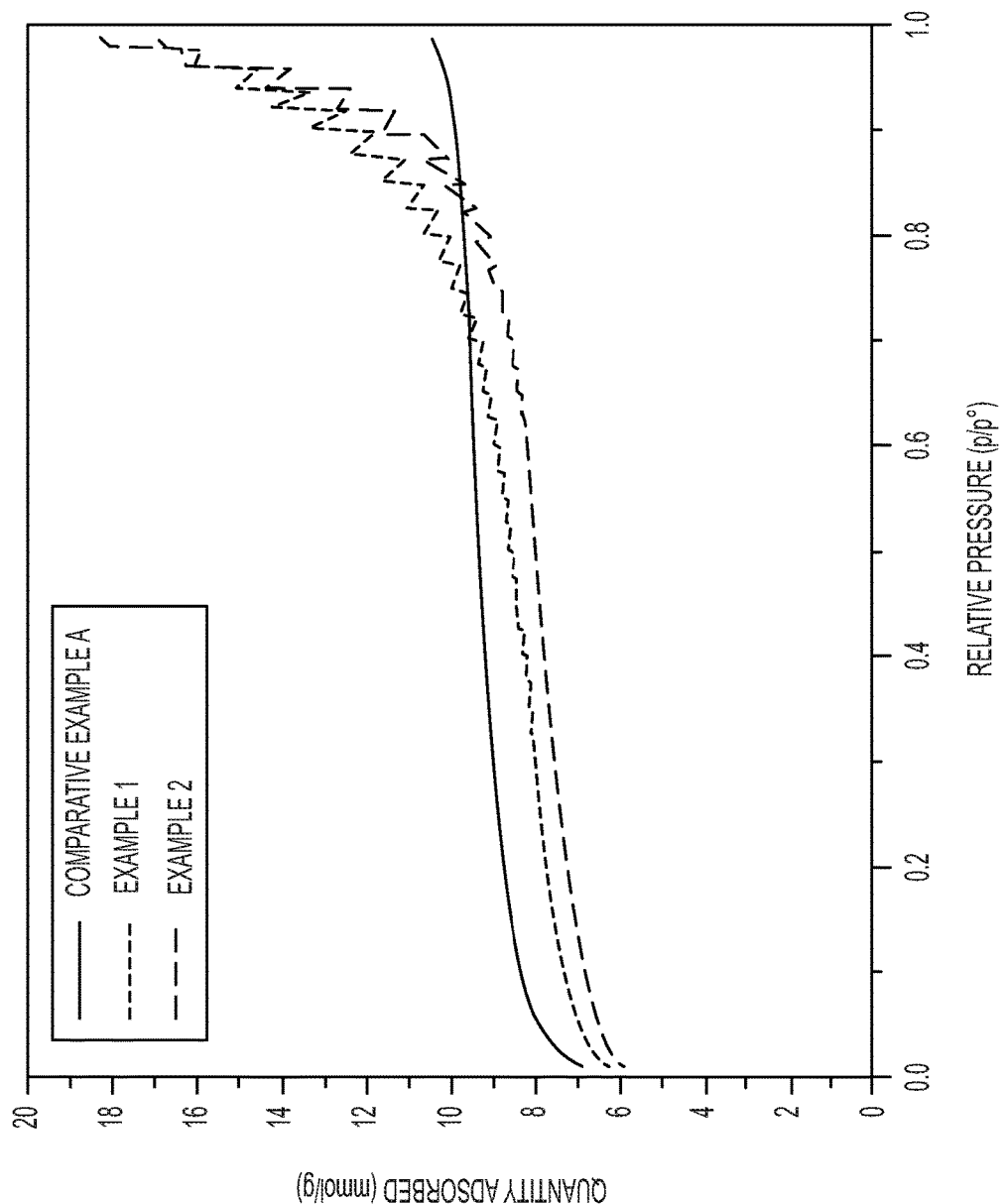
FIG. 2 is a graphical depiction of the argon sorption isotherm of parent zeolite beta as compared to two hierarchical mesoporous zeolite beta catalysts at 87K.

FIG. 2 shows the argon sorption isotherms for Comparative Example A, Example 1, and Example 2. The initial uptakes are related to micropore filing, so similar initial uptakes indicate retained crystallinity and micropore volume. As can be seen in FIG. 2, the samples display similar initial uptakes at relative pressures less than 0.1. This is indicative of preserved crystallinity and microporosity in the produced hierarchical mesoporous beta zeolite. At higher relative pressures, Examples 1 and 2 exhibit greater argon uptake than the parent zeolite, Comparative Example A, as well as the formation of the desorption hysteresis loop. This shows that mesopores were created in the produced zeolites.

Figure 3:
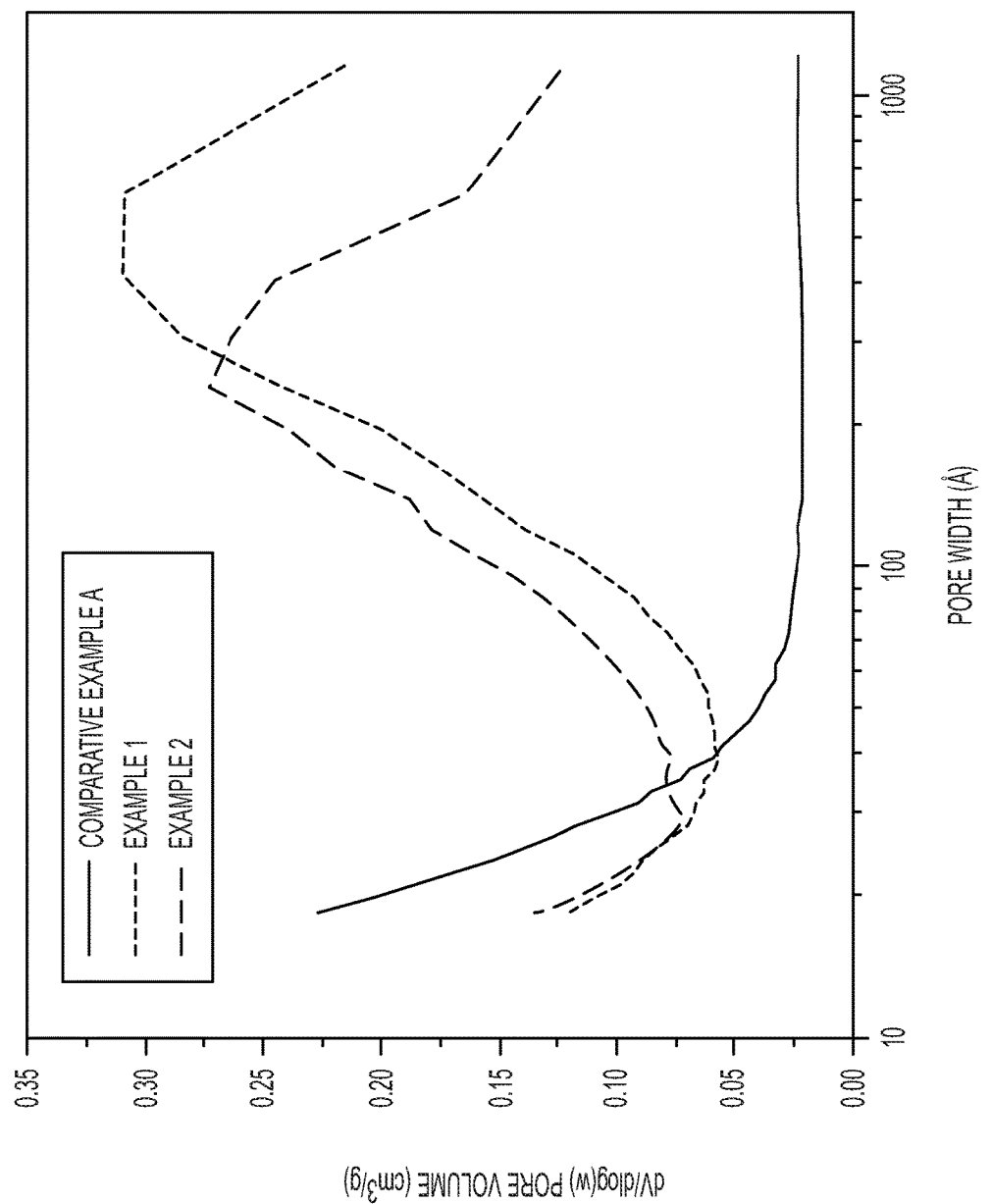
FIG. 3 is a graphical depiction of the Barrett-Joyner-Halenda pore size distribution analysis of parent zeolite beta as compared to two hierarchical mesoporous zeolite beta catalysts.

FIG. 3 shows the BJH analysis for Comparative Example A, Example 1, and Example 2. The average pore width and total pore volume data obtained from this plot is summarized in Table 1.

TABLE 1

| Sample | NaOH concentration | Heating Time | Average Pore Size | Total Pore Volume |
|---|---|---|---|---|
| Comparative Ex. A | N/A | N/A | 3.8 nm | 0.33 cm$^3$/g |
| Example 1 | 0.2M | 21 hours | 11.1 nm | 0.48 cm$^3$/g |
| Example 2 | 0.3M | 21 hours | 14.4 nm | 0.49 cm$^3$/g |

Table 1 shows that the total pore volume of the produced hierarchical mesoporous beta zeolites increased by more than 45% over the parent zeolite (Comparative Ex. A). The increase in total pore volume is due to the creation of mesopores. FIG. 3 also shows that peak mesopore size increased to around 25 nm for Example 1 and to 40-50 nm for Example 2. This is represented in Table 1 by the average pore size, which increased to 11.1 nm for Example 1 and 14.4 nm for Example 2. The increases in peak mesopore size and average pore size are indicative of mesopore formation on the produced hierarchical mesoporous beta zeolites.

Figure 4:
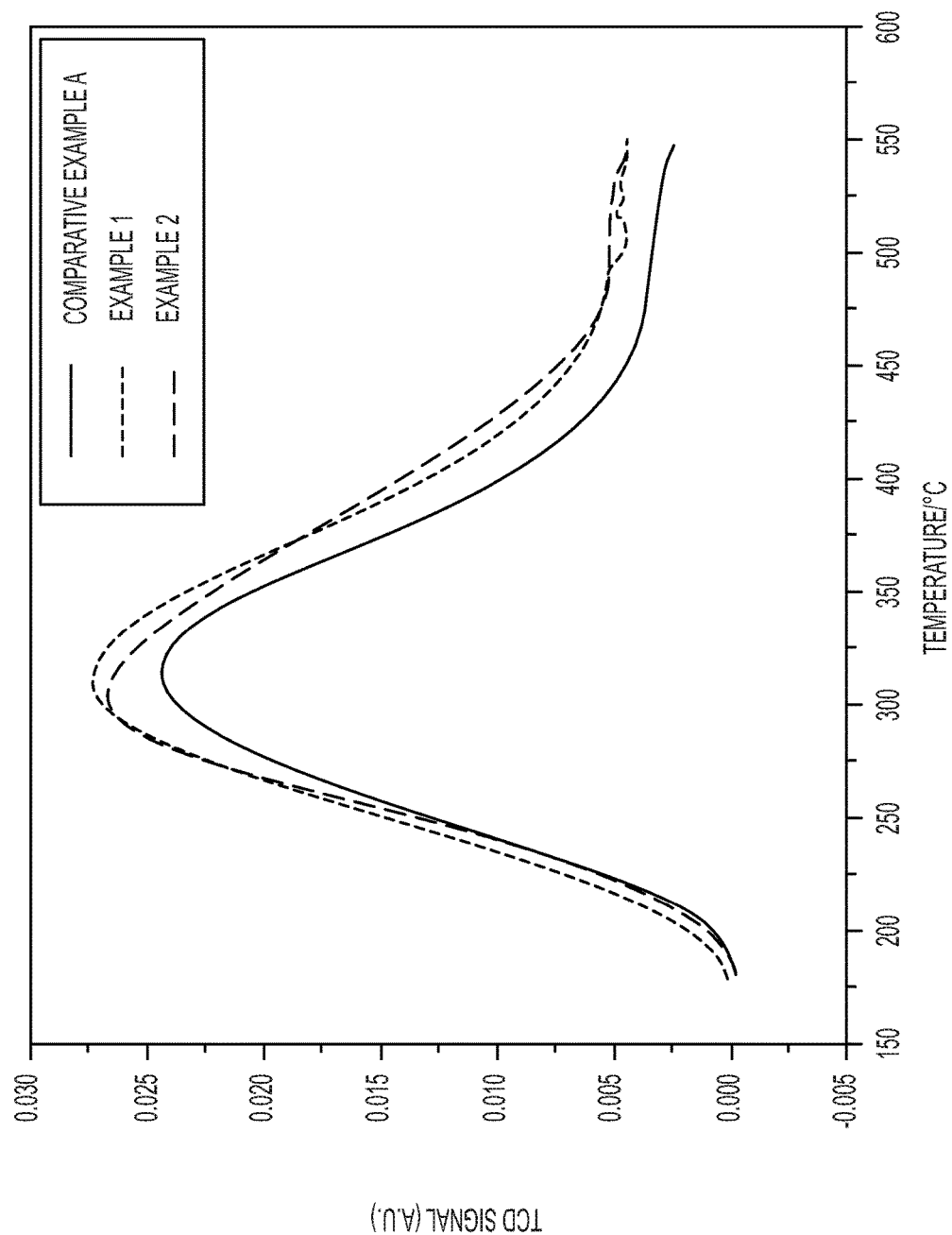
FIG. 4 is a graphical depiction of an ammonia temperature programmed desorption (NH$_3$-TPD) plot of parent zeolite beta as compared to two hierarchical mesoporous zeolite beta catalysts.

FIG. 4 shows the NH$_3$-TPD profiles for Comparative Example A, Example 1, and Example 2. As can be seen in FIG. 4, Comparative Example A exhibits one maximum desorption peak, at around 315° C. Example 1 and Example 2 also exhibit one maximum desorption peak. Example 1 has a maximum desorption at 315° C. and Example 2 has a maximum desorption at 305° C. The fact that Examples 1 and 2 shared the same maximum desorption patterns as Comparative Example A and at about the same temperature illustrates preserved crystallinity in the produced hierarchical mesoporous beta zeolites.

The catalytic activity of Comparative Example A, Example 1, and Example 2 were also compared. In mesitylene alkylation, benzyl alcohol is consumed simultaneously via alkylation and etherification. One reaction, the alkylation reaction, produces 1,3,5-trimethyl-2-benzylbenzene. The other reaction, an etherification, produces dibenzyl ether. The alkylation occurs exclusively on the external acid sites of the zeolite, because the bulky mesitylene cannot enter the micropores of beta zeolites. The etherification reaction occurs on both external and internal acid sites of the zeolite. Therefore, zeolites with hierarchical mesopores will show a decrease in selectivity, where selectivity is calculated as twice the concentration of the ether product divided by the concentration of the alkylation product.

While hierarchical mesoporous zeolites will show decreased selectivity compared to their parent beta zeolites, zeolites that have lost their crystallinity exhibit a lower benzyl alcohol conversion as their catalytic sites have been destroyed. A hierarchical mesoporous zeolite beta with retained crystallinity should show decreased selectivity while maintaining the benzyl alcohol conversion percentage. The benzyl alcohol conversion percentage and selectivity of Comparative Example A, Example 1, and Example 2 is shown in Table 2, for a mesitylene and benzyl alcohol alkylation reaction at 120° C. for two hours, where the molar ratio of mesitylene to benzyl alcohol is 34.

TABLE 2

| Sample | Benzyl Alcohol Conversion | Selectivity |
|---|---|---|
| Comparative Example A | 49.6% | 2.5 |
| Example 1 | 84.5% | 1.0 |
| Example 2 | 61.6% | 1.1 |

As can be seen from Table 2, the creation of mesopores did not sacrifice catalytic activity by ruining crystallinity. Both Example 1 and 2 had a higher benzyl alcohol conversion rate than Comparative Example A. Further, the decreased selectivity for Example 1 and 2 shows that hierarchical mesopores were formed on the zeolite.

The examples show that hierarchical mesoporous beta zeolites are formed from treating beta zeolite with an aqueous metal hydroxide at 150° C. The mesoporous beta zeolites have a larger average pore size and total pore volume than the parent beta zeolites. Further, the mesoporous beta zeolites did not lose their crystallinity or catalytic activity in the process used to create the mesopores.

The subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

A first aspect of the disclosure is directed to a method for producing hierarchical mesoporous beta zeolites comprising: providing parent beta zeolites having a molar ratio of silicon to aluminum of from 5 to 50; mixing the parent beta zeolites with an aqueous metal hydroxide solution; and heating the parent beta zeolites and aqueous metal hydroxide mixture to a temperature greater than or equal to 100° C. to produce the hierarchical mesoporous beta zeolites having an average pore size greater than 8 nanometers; where the hierarchical mesoporous beta zeolites are produced without a templating agent or a pore-directing agent.

A second aspect of the disclosure includes the first aspect, and is directed to the method of the first aspect, where the parent beta zeolites have a molar ratio of silicon to aluminum.

A third aspect of the disclosure includes the first or second aspects, and is directed to a method of the first aspect, where the aqueous metal hydroxide is an alkali metal hydroxide or an alkali earth metal hydroxide, or both.

A fourth aspect of the disclosure includes any of the first through third aspects, and is directed to a method of the first aspect, where the parent beta zeolite and aqueous metal hydroxide mixture is heated to a temperature greater than 100° C.

A fifth aspect of the disclosure includes any of the first through fourth aspects, and is directed to a method of the first aspect, where the parent beta zeolite and aqueous metal hydroxide mixture is heated for a time interval of greater than or equal to 1 hour.

A sixth aspect of the disclosure includes any of the first through fifth aspects, and is directed to a method of the first aspect, where the produced hierarchical mesoporous beta zeolites have a total pore volume greater than or equal to 0.30 cm$^3$/g.

A seventh aspect of the disclosure includes any of the first through sixth aspects, and is directed to a method of the first aspect, where the produced hierarchical mesoporous beta zeolites exhibit an x-ray diffraction peak at 2Θ from 7 degrees to 9 degrees and another x-ray diffraction peak at 2Θ from 21 degrees to 23 degrees.

An eighth aspect of the disclosure includes any of the first through seventh aspects, and is directed to a method of the first aspect, where the produced hierarchical mesoporous beta zeolites have a peak pore size of greater than or equal to 20 nanometers.

A ninth aspect of the disclosure includes any of the first through eighth aspects, and is directed to a method of the first aspect, where the pH of the parent beta zeolites and aqueous metal hydroxide mixture is greater than or equal to 12.

A tenth aspect of the disclosure includes any of the first through ninth aspects, and is directed to a method of the first aspect, where the concentration of the aqueous metal hydroxide solution has a concentration from 0.01 M to 10 M.

Unless otherwise defined, all technical and scientific terms used in this disclosure have the same meaning as commonly understood by one of ordinary skill in the art. The terminology used in the description is for describing particular embodiments only and is not intended to be limiting. As used in the specification and appended claims, the singular forms "a," "an," and "the" are intended to include the plural forms as well, unless the context clearly indicates otherwise.

It will be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

What is claimed is:

1. A method for producing hierarchical mesoporous beta zeolites comprising:
   providing parent beta zeolites having a molar ratio of silicon to aluminum of from 5 to 50;
   mixing the parent beta zeolites with an aqueous metal hydroxide solution, where the aqueous metal hydroxide is an alkali metal hydroxide or an alkali earth metal hydroxide, or both; and
   heating the parent beta zeolites and aqueous metal hydroxide mixture at an autogenous pressure to a temperature greater than or equal to 100° C. to produce the hierarchical mesoporous beta zeolites having an average pore size greater than 8 nanometers;
   where the hierarchical mesoporous beta zeolites are produced without a templating agent or a pore-directing agent; and
   where the produced hierarchical mesoporous beta zeolites have a total pore volume greater than or equal to 0.30 cm$^3$/g.

2. A method of claim 1, where the parent beta zeolites have a molar ratio of silicon to aluminum of from 10 to 25.

3. A method of claim 1, where the parent beta zeolite and aqueous metal hydroxide mixture is heated to a temperature greater than 100° C.

4. A method of claim 1, where the parent beta zeolite and aqueous metal hydroxide mixture is heated for a time interval of greater than or equal to 1 hour.

5. A method of claim 1, where the produced hierarchical mesoporous beta zeolites exhibit an x-ray diffraction peak at 2Θ from 7 degrees to 9 degrees and another x-ray diffraction peak at 2Θ from 21 degrees to 23 degrees.

6. A method of claim 1, where the produced hierarchical mesoporous beta zeolites have a peak pore size of greater than or equal to 20 nanometers.

7. A method of claim 1, where the pH of the parent beta zeolites and aqueous metal hydroxide mixture is greater than or equal to 12.

8. A method of claim 1, where the concentration of the aqueous metal hydroxide solution has a concentration from 0.01 M to 10 M.

* * * * *